United States Patent [19]
Argiropoulos

[11] Patent Number: 5,787,751
[45] Date of Patent: Aug. 4, 1998

[54] APPARATUS AND METHOD FOR THE CUTTING AND BENDING OF SHEET MATERIAL SUCH AS METAL

[76] Inventor: John G. Argiropoulos, 4741 N. Rock Spring Rd., Arlington, Va. 22207

[21] Appl. No.: 848,225

[22] Filed: Apr. 29, 1997

Related U.S. Application Data

[63] Continuation-in-part of Ser. No. 319,558, Oct. 7, 1994, abandoned.

[51] Int. Cl.$^6$ ............................................ B21D 43/28
[52] U.S. Cl. ........................... 72/339; 72/405.01; 83/165
[58] Field of Search ........................... 72/294, 319, 339, 72/419, 428, 331, 337, 275, 330, 420, 405.01, 426; 83/165, 106

[56] References Cited

U.S. PATENT DOCUMENTS

| | | | |
|---|---|---|---|
| 550,381 | 11/1895 | Rand | 72/426 |
| 696,784 | 4/1902 | Yager | 72/294 |
| 864,349 | 8/1907 | Yager | 72/337 |
| 1,174,747 | 3/1916 | McDonald | 83/106 |
| 1,559,835 | 11/1925 | Ziler | 72/330 |
| 1,584,998 | 5/1926 | Symons | 72/335 |
| 1,956,216 | 4/1934 | Booth | 72/426 |
| 2,178,461 | 10/1939 | Apprill | 72/405.01 |
| 2,297,948 | 10/1942 | Eisenhauer | 72/405.06 |
| 2,644,521 | 7/1953 | Lawson | 83/106 |
| 3,470,725 | 10/1969 | Brown | 72/336 |
| 3,595,058 | 7/1971 | Beneke | 72/339 |
| 3,878,745 | 4/1975 | Handziak | 83/165 |

*Primary Examiner*—Daniel C. Crane
*Attorney, Agent, or Firm*—Thomas E. Lynch

[57] ABSTRACT

Plural station apparatus and method is provided for the making of articles of manufacture from sheet material. The first work station performs a first cutting operational step on the sheet material to cut a plurality of precisely cut blanks, and two bending or folding stations perform the finishing step on the blanks to produce the articles of manufacture. The first station is located above the bending or folding stations, and it is laterally offset from each of them. The first station is laterally offset in a first direction with respect to the first work station, and the second is laterally offset in a second direction with respect to the first work station. Two inclined chutes are provided between the output of the first station for allowing the precise blanks to slide by gravity to the input of the first and second bending or folding stations. Thus, the inclined chutes automatically transfer the precise blanks from the first station to the two bending or folding stations solely by gravity. Between the first elevated station and the two bending or folding stations there is provided a directing apparatus which directs a portion of the blanks from the elevated station to the first inclined chute and another portion of the blanks to the second inclined chute. In a specific embodiment, the sheet material is sheet metal, and articles of manufacture are roof flashings.

15 Claims, 6 Drawing Sheets

APPARATUS AND METHOD FOR THE CUTTING AND BENDING OF SHEET MATERIAL SUCH AS METAL

This application is a continuation-in-part of Ser. No. 08/319,558, filed Oct. 7, 1994 which has been abandoned in favor of application Ser. No. 08/841,777, filed May 5, 1997. Application Ser. No. 08/841,777 is a full continuation of application Ser. No. 08/319,558, now abandoned.

Be it known that I, John G. Argiropoulos, a citizen of the United States, whose Post Office address is: 4741 N. Rock Spring Rd., Arlington, Va. 22207, have invented a new, useful and unobvious apparatus and method for the cutting and bending of sheet material such as sheet metal, as fully disclosed and described below.

BACKGROUND OF THE INVENTION

1. Field of Invention

The present invention pertains generally to a method and apparatus which facilitates the sequential operation of a plural station cutting and bending apparatus, more particularly, to the cutting and bending of wide, thin, flexible and awkward sheet metal, whereby prior art manual transfer operations are eliminated which improves the efficiency of these operations and reduces the cost of the end product. This invention includes a plural station apparatus and method, wherein sections of stock sheet material are first fed into the cutting station of a plural station apparatus. The cutting station is programmed to cut the sheet material to the appropriate dimensions to produce a precise blank which may also be wide, thin, flexible and awkward. With my improved apparatus and method, the blanks are then automatically fed to two programmed bending or folding stations which bend the blank to produce the articles of manufacture. By automatically forwarding the cut blanks to the bending or folding stations, the manually intensive step of carrying the wide, thin, flexible and awkward blanks from the cutting station to the bending or folding stations is eliminated. Moreover, since the cutting time is normally substantially less than the time required for bending or folding the final product, the use of two bending or folding stations in this improved apparatus and method substantially reduces the time required for a single production run. Therefore, I have found that a single cutting station can easily supply two bending or folding stations, either alternatively or sequentially, to process a single production run in much less time than the time necessary for the same production run with my parent apparatus and method. Alternatively, again since the cutting operation normally takes less time, two separate production runs of different articles of manufacture can be processed during the same time frame required for a single production run with my parent apparatus and method. Thus, whether a single production run or plural production runs are processed, a vastly increased efficiency, as much as 100%, is achieved over my basic machine as disclosed and claimed in my parent application.

2. Discussion of the Background of the Invention

The uses of plural station cutting and bending operations on sheet materials have proliferated over the years. Such cutting and bending operations are useful in forming a variety of products such as cardboard to form boxes; paper to form books, folders, brochures, etc.; plastic products to form containers, decorative items, etc.; and sheet metal products to form decorative and functional architectural elements such as roof flashings.

The prior art falls generally into two broad categories: i.e., a simple manual, two-station system, and much more complex, automatic systems. A simple manual system includes separate cutting and bending or folding stations which are stand-alone machines that are physically separated from each other. In such a system, the stock sheet material is cut in a first machine to form a blank, and the cut blank is then manually hand carried from the cutting station to a bending or folding station for the final processing. One disadvantage of such simple systems are that the cut blanks are often wide, thin, flexible and awkward, thus requiring more than one person to manually hand carry them between stations. Also, the blanks may be so large and flexible that they even require an intermediate table to support them during transfer. Thus, the simple manual systems are slow and manually intensive which reduces their efficiency of operation, and therefore, the ultimate cost of the finished products. On the other hand, the costly automatic systems usually include expensive, complex electromechanical transfer devices such as numerically controlled synchronized conveyers or transfer tables. These devices, while very fast, are often difficult to initially program for a specific product, and because of their high initial cost, are not efficient for small production runs. Therefore, neither the simple stand-alone systems, nor the complex automatic transfer systems, are efficient for the average small fabricating shop with small to moderate sized production runs.

SUMMARY OF THE INVENTION

It is an object of the present invention to provide a semi-automatic method and apparatus for facilitating the transfer of wide, thin, flexible, and thus, awkward sheet material blanks from a single cutting station to two bending or folding stations while eliminating the laborious manual transfer step required by the simple prior art systems, and which performs this transfer operation in an automatic manner which does not require the costly electromechanical transfer tables of the complex prior art systems.

It is a further object of this invention wherein wide, thin, flexible, and thus, awkward cut blanks are transferred in a manner which does not require the handling of each blank separately, such as required in both the simple manual systems and the complex electromechanical transfer systems. Thus, the cut blanks cannot be harmed, such as being bent or dropped in the manual systems, or by scratches or other surface blemishes caused by the mechanical gripping in the expensive and complex electromechanical systems.

Finally, it is an object of this invention to automatically stack the cut blanks against fixed, upright flanges at the input of each bending or folding station whereby they are readily removed from the stack for insertion into the bending stations.

These and other objects are achieved by raising the cutting station above, and offset from, the bending or folding stations, and by including two oppositely facing gravity fed chutes between the output of the cutting station with one of the chutes directing blanks to the input of one of the bending or folding stations, and the other chute directing blanks to the other bending or folding station. The bending or folding stations are offset in different directions from the cutting station. The result is an efficient and effective transfer of the cut blanks to the bending or folding stations, whereby the step of manually carrying the wide, thin, flexible, and thus, awkward blanks between the stations is eliminated, whereby complex and expensive electromechanical transfer tables are not required, whereby the cut blanks are not harmed in any manner, and whereby the cut blanks are neatly stacked at the input of each of the bending stations.

DESCRIPTION OF THE PREFERRED EMBODIMENT

In the following, the present invention will be described in detail in conjunction with the exemplary embodiments thereof with reference to the accompanying drawings. Also in the drawings, those elements of the prior art and those elements of the invention in the various Figures which are in common, will be referred to by the same numerals.

Figure 1:
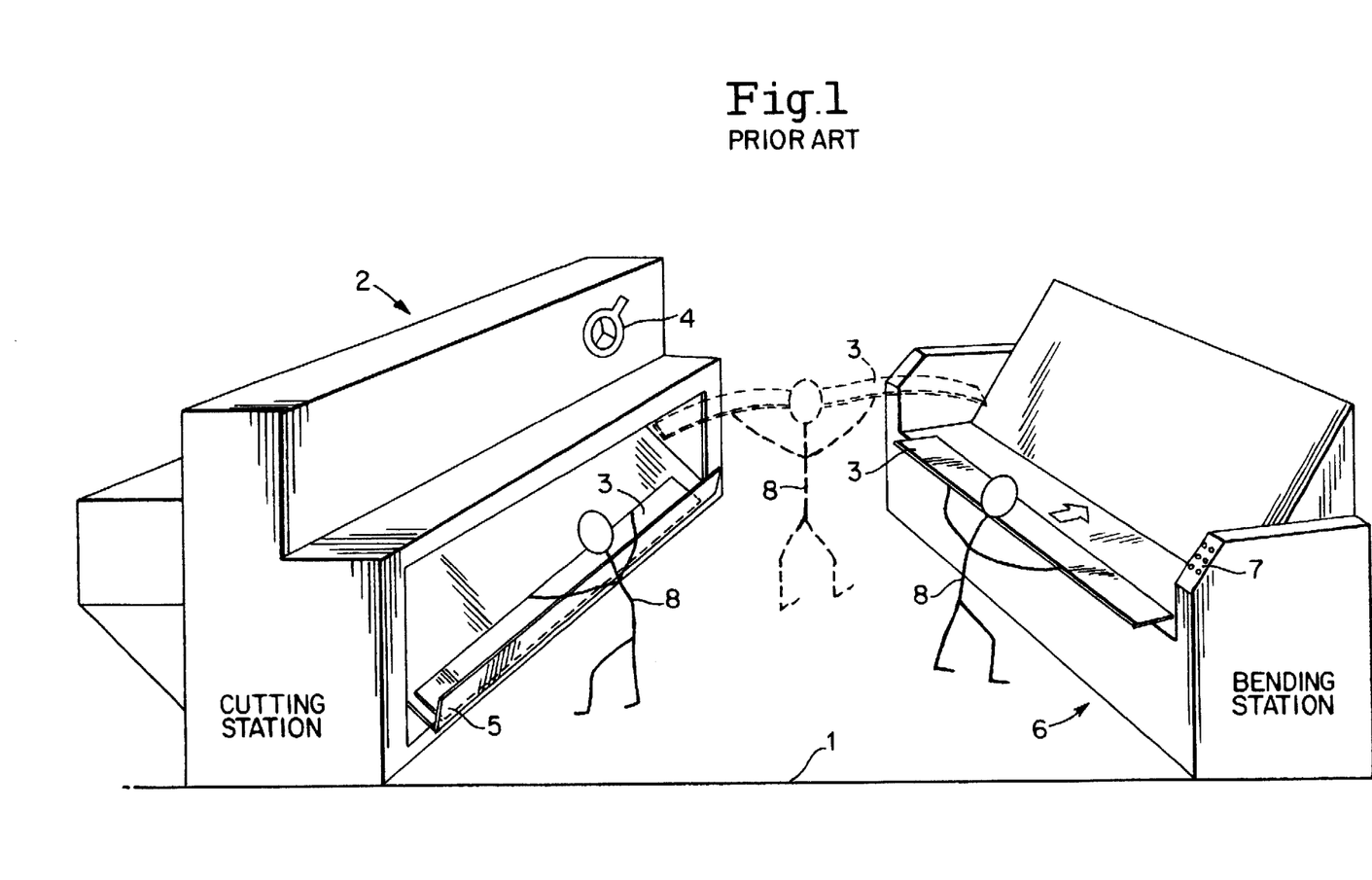
FIG. 1 is a view of a simple manual prior art embodiment which requires an operator, or operators, to manually transfer the cut blanks between two stations.

FIG. 1 is a side view of a simple prior art system. In this Figure, reference numeral 1 denotes the shop floor upon which the cutting and the bending or folding stations are placed. Numeral 2 depicts the cutting station. The cutting station 2 is shown placed to the left of the bending or folding station which is represented by the numeral 6. The cutting station 2 can be any representative commercially available cutting machine such as the Roper-Whitney Mechanical Shear, Model 10M14. Such machines typically accept the blank sheet materials, cut the blank sheet materials by the positioning of mechanical shears, and then exit the precisely cut blanks as indicated by numeral 3. The cut blanks 3 are exited from the cutting station 2 to the exit trough 5 near the floor of the shop. The cut blanks 3 can be quite wide in the lateral direction, often as long as eight to ten feet in length. The precise dimensions of the cut blanks are set into the machine by a programming wheel as indicated by the numeral 4.

The specifics of the cutting station 2 are not disclosed in detail herein since they are not pertinent to the claimed invention. The programming of the cutting station can be as simple or as complicated as desired by the user of the system, and as dictated by the technical capabilities of the particular cutting machine used.

The bending or folding station 6 in FIG. 1 is also depicted as placed on the shop floor 1 to the right of the cutting station 2. The bending or folding station 6 can be any convenient commercially available bending or folding machine such as the RAS Folding Machine, Model 67.30. Such machines typically accept the precisely cut blanks 3, and bend or fold them to some programmed shape by a plurality of preprogrammed bending brakes, not shown. Since the specifics of the bending or folding machine are also not necessary to the understanding of the claimed invention, their details are not disclosed herein. The bending or folding operation is programmed by the touch pad 7 on the right hand side panel of the machine. The programming of the bending or folding station 6 can be as simple or as complicated as desired by the user of the system, and as dictated by the technical capabilities of the particular bending or folding machine chosen.

Finally, as depicted by an operator indicated by the numeral 8, the cut blanks 3 of FIG. 1 are transferred from the cutting machine 2 to the bending or folding machine 6 by manually lifting them individually from the floor level exit trough 5, and transferring each blank 3 to the bending or folding machine 6. Not only is such a process slow and inefficient, it is also possible for the operator to drop the cut blank 3, possibly damaging it, which increases the wastage of the system. More importantly, when the cut blanks 3 are very wide as indicated above, they are quite thin, flexible and awkward as indicated by the dotted line embodiment of FIG. 1. Thus, they are subject to permanent deformation which either damages them or makes them difficult to insert into the bending or folding station. Therefore, in the past, the transfer between stations often required two men, or at the very least, required an intermediate table (not shown) to facilitate the transfer.

Although the bending or folding station 6 is shown to the right of the cutting station 2, it is clear that their relative positions could be transposed. Also, they could be placed side-by-side, they could be placed at 90 degrees, or they could be placed at another convenient position as dictated by the space available on the shop floor. In any case, any placement in the prior art would still require the manual lifting and transfer of the cut blanks 3 from the cutting station to the bending or folding station with all of the incidental problems listed above.

A complex electromechanical transfer mechanism is not depicted in the drawings because its description would unnecessarily clutter the description of the invention. However, an example of such a complex system is disclosed in the U.S. Pat. No. 5,099,981 to Guzzoni, which issued on Mar. 31, 1992. Such a system, while clearly adaptable to a plural station cutting and bending operation, would obviously be impractical for all but the largest and expensive of industrial installations.

Figure 2:
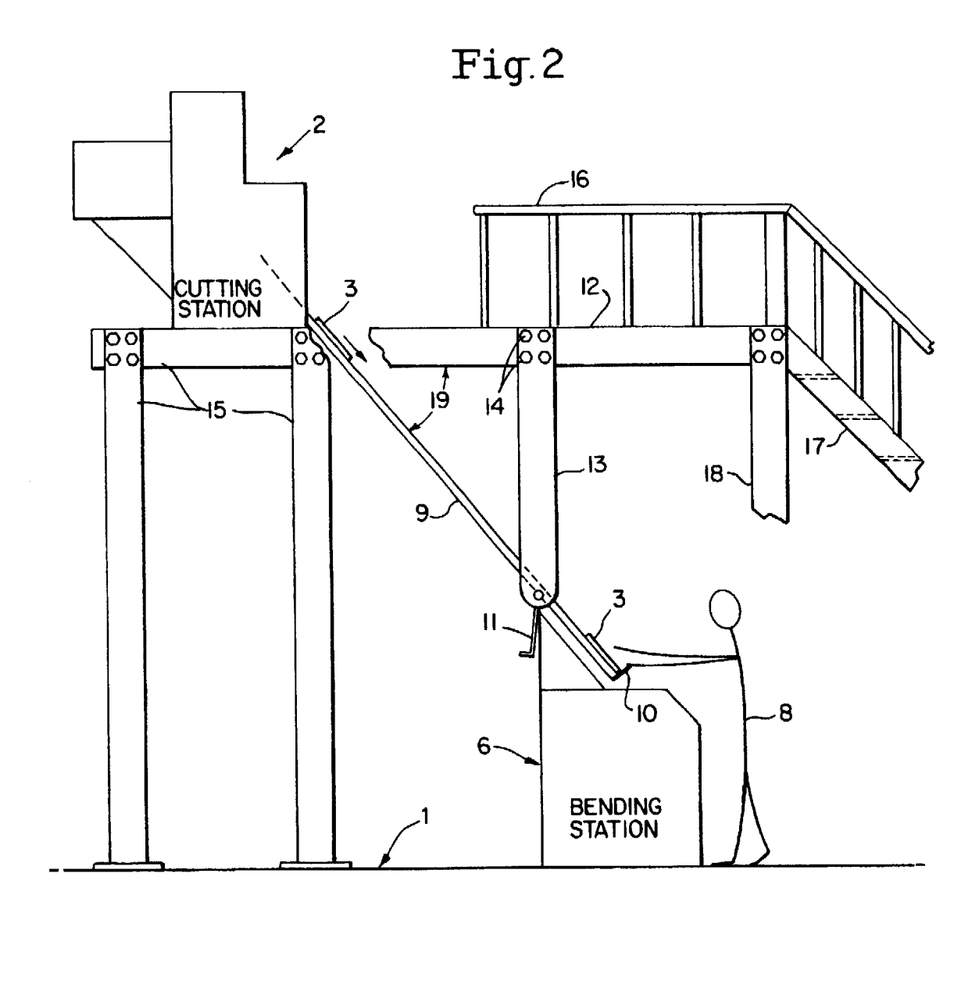
FIG. 2 is the side view of the invention of the parent application Ser. No. 08/319,558, now abandoned, supra, wherein a difference in height between a cutting and a bending station is depicted, and which shows a gravity fed chute for automatically transferring the cut blanks between the cutting and the bending or folding station.

FIG. 2 is directed to the embodiment of the invention as disclosed and claimed in parent application Ser. No. 08/319,558, which was filed on Oct. 7, 1994. The present application is a continuation-in-part of that application, and priority is claimed as to all common subject matter. As noted above, those elements in common with the prior art of FIG. 1 are given the same numerical designation. The shop floor is again indicated by the numeral 1. Mounted on the floor 1 is a raised platform 12 which supports the cutting machine 2. If desired, the cutting machine 2 can be the same cutting machine 2 as that depicted in prior art FIG. 1. The raised platform 12 is supported on the floor 1 by the posts and superstructure indicated generally by the numerical elements 15. The cutting machine exit trough 5 has been modified from the FIG. 1 embodiment by extending it several feet, and by sloping it to form a gravity exit chute 9. The raised platform 12 is shown cut-away so that the extension of the exit chute 9 from the cutting station 2 is more clearly shown. The preferred angle of slope 19 is approximately 30 degrees, although any other convenient angle which is sufficient to allow the cut blanks 3 to slide between the cutting station and the bending station, is also contemplated. Too steep an angle 19, however, may cause the cut blanks 3 to fall rather than slide along the exit chute 9 which could be undesirable.

The exit chute 9 is terminated with a fixed, upright flange 10 which receives the cut blanks 3 as they are exited from the cutting machine 2. The cut blanks 3 are stacked against the flange 10 in such a way that they are easily available to the operator 8 as indicated in FIG. 2. The cut blanks 3 in FIG. 2 are depicted with an exaggerated thickness whereby they are more clearly shown with respect to the exit chute 9. The exit chute 9 is stiffened widthwise into FIG. 2 near the end flange 10 by a brace 11 which extends along the width of the exit chute 9. As indicated above, since the cut blanks 3 can be quite wide (8 to 10 ft.), the width of the chute 9 must be sufficient to accommodate such widths. The exit chute 9 is also supported in its sloped position by the support arms 13 which are attached at either side of the chute, and which are attached at their upper ends by elements 14 to the superstructure 15 of the raised platform 12.

Around the raised platform 12 is a railing 16, and at one end of the raised platform is a stairway 17 which extends to the shop floor 1 to allow access between the shop floor 1 and the cutting station 2 resting on the raised platform 12. The railing 16 also extends downward from the raised platform 12 along the stairway 17 to provide support for an operator when he gains access to the raised platform 12. The extension of the stairway 17 to the shop floor 1 is not shown since it would unnecessarily clutter the Figure.

The bending or folding station 6, which may be the same machine as the prior art bending or folding machine 6 depicted in FIG. 1, is placed on the shop floor 1 offset to the right of and below the cutting station as depicted in the FIG. 2. Of course, the arrangement of the stations can be reversed, as in a mirror image, just as long as the cutting station is above and offset from the bending or folding station.

One of the raised platform support posts in FIG. 2 forming part of the support structure 15 is shown cut-away at numeral 18 to show an operator 8 standing on the shop floor in front of the bending or folding station 6. The cut blanks 3 which exit from the cutting station 2 slide down the exit chute 9 to the fixed, upright flange 10 where they are stacked so that the operator can easily remove them for entry into the bending or folding station 6. The exit chute 9 thus provides an automatic transfer between the two stations without (1) requiring the step of manually transferring the cut blanks 3 in the simple prior art of FIG. 1, or (2) the expensive electromechanical transfer mechanisms of the complex prior art systems. The result is an elegant solution to the problems of the prior art as outlined above.

Figure 3:
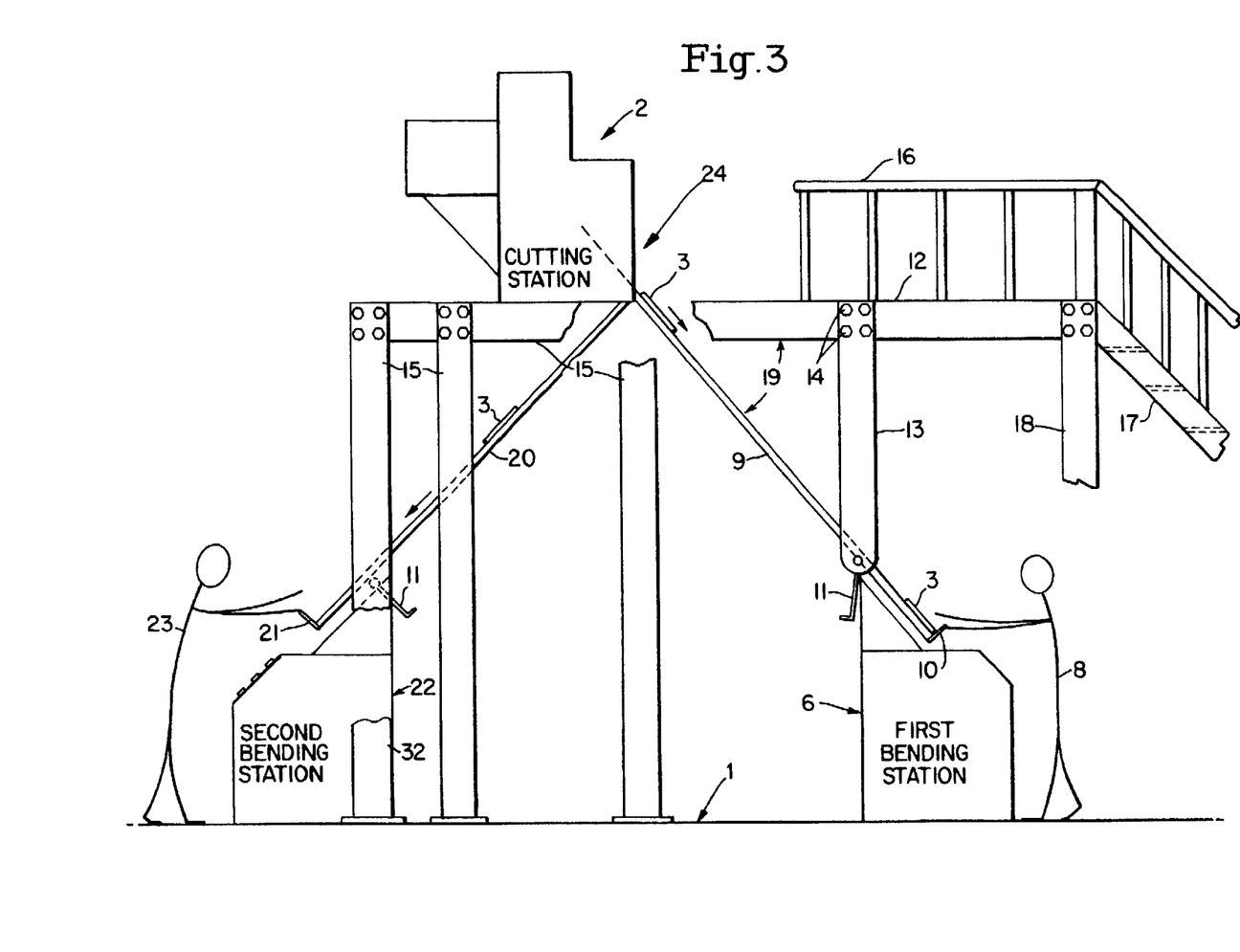
FIG. 3 is a side view of the present invention, wherein the same difference in height between the cutting and the bending or folding stations is maintained, but further comprising two offset bending or folding stations with two gravity fed chutes for transferring the cut blanks between the cutting station and two bending or folding stations.

FIG. 3 is directed to an improved version of the machine disclosed in FIG. 2. As stated above, where possible all elements in common between the Figures utilize the same numbering system. In this version of my machine, the shop floor is again indicated by the numeral 1. Like the device of FIG. 2, a raised platform 12 is mounted on the shop floor 1 which supports the cutting station 2. The raised platform 12 is supported on the floor 1 by the posts and superstructure generally indicated by the numerical elements 15. If desired, the cutting station 2 can comprise the same cutting machine as that depicted in FIGS. 1 and 2 which exits the cut blanks 3 from one side of the machine as indicated by the rightly directed arrow adjacent the upper blank 3. Alternatively, the cutting station can be a cutting machine such as that disclosed in FIG. 4 which can exit the cut blanks 3 from either the front or the rear of the machine 2. As a further alternative, the cutting station 2 may comprise a cutting machine which exits the cut blanks in only one direction, but includes modifying structure such as disclosed in FIGS. 5–9 for directing the cut blanks toward a forwardly directed gravity chute 9 or a rearwardly directed gravity chute 20. FIG. 3 is not directed to any specific structure for the directing and redirecting of the cut blanks 3 to the differently directed chutes 9 or 20. Instead, the directing mechanism is only broadly indicated by the arrow 24. Arrow 24 is intended to generically embrace any of the various ways in which the cut blanks 3 can be directed to the oppositely directed gravity fed chutes 9 and 20 in FIGS. 4–9.

Continuing with FIG. 3, the cutting machine exit trough 5 of FIG. 1 has been modified by providing two exit chutes 9 and 20 which are sloped to form gravity chutes which slope in two opposite directions. Of course, other directions besides opposite directions are also contemplated within the broad limits of this invention. The raised platform 12 is shown cut-away so that the exit chutes 9 and 20, shown sloped toward the bending or folding stations 6 and 22, are more clearly shown. A preferred angle of slope 19 for chute 9 is approximately 30 degrees, although any other convenient angle which is sufficient to allow the cut blanks 3 as indicated by the arrow to freely slide between the cutting station and the fixed, upright flange 10 at the input of the first bending or folding station 6 is contemplated. Too steep an angle 19, however, may cause the cut blanks 3 to fall rather than slide along the exit chute 9 which could be undesirable. Similarly, too gentle a slope may also be undesirable because the blanks 3 may not fully slide down to stack at the fixed, upright flange 10. A similar angle of slope is provided for the oppositely facing inclined chute 20 which allows the blanks 3 to alternatively slide down the chute 20 as indicated by the arrow to the input of a second bending or folding station 22. The slopes of the two exit chutes need not be identical, but may be adjusted to meet the space conditions available on the shop floor.

The exit chute 9 is terminated with a fixed, upright end flange 10 which receives a portion of the cut blanks 3 as they are exited from the cutting machine 2. Similarly, the opposite facing exit chute 20 is also terminated with a fixed, upright flange 21 which also receives a portion of the cut blanks 3. The cut blanks 3 are allowed to stack against the end flanges 10 and 21 in such a way that they are easily available to the operators 8 and 23. Dependent upon the work load and the type of work being performed, it may not be necessary to provide two operators 8 and 23, only one operator being sufficient. However, at other times where a heavy production run is being performed, as many as three operators, one operating the cutting station and one for each of the bending or folding stations, may be utilized.

The cut blanks 3 in FIG. 3 are depicted with an exaggerated thickness whereby they are more clearly shown with respect to the exit chutes 9 and 20. As indicated above, since the blanks 3 can be quite wide (8 to 10 ft.), the width of the chutes 9 and 20 must be sufficient to accommodate such widths. The exit chutes 9 and 20 are stiffened as necessary widthwise into FIG. 3 near the end flanges 10 and 21 by braces 11 which extend along the width of the chutes. Other bracing may be provided as necessary. Exit chute 9 is also supported in its sloped position by the support arms 13 which are attached at either side of the chute, and which are attached at their upper ends by elements 14 to the superstructure 15 of the raised platform 12. Similarly, the exit chute 20 is also supported in its sloped position at either side of the chute by two of the outside legs 15 of the superstructure. Alternatively, exit chute 20 could be supported by additional arms 13 instead of legs 15 in a manner comparable to the support of exit chute 9.

Around the raised platform 12 is a railing 16, and at one end of the raised platform is a stairway 17 which extends to the shop floor 1 to allow easy access between the shop floor 1 and the cutting station 2 resting on the raised platform. The railing 16 also extends downward from the raised platform 12 along the stairway 17 to provide support for an operator when he gains access to the raised platform 12. The extension of the stairway to the shop floor 1 is not shown since it would unnecessarily clutter the Figure.

The first bending or folding station 6, which may comprise the same machine as the bending or folding machine 6 depicted in FIGS. 1 and 2, is placed on the shop floor 1 to the right of and below the cutting station 2 as depicted in FIG. 3. Similarly, the second bending or folding station 22, which may comprise another bending or folding machine of the same the type depicted in FIGS. 1 and 2, is also placed on the shop floor 1, but to the left of and below the cutting station 2 as depicted in FIG. 3. Of course, the arrangement of the stations can be reversed, as in a mirror image, just as long as the cutting station is above and offset laterally from the bending stations. Similarly, although oppositely facing gravity exit chutes is the most efficient arrangement, other arrangements are also contemplated. Further, one of the bending or folding machines can be more sophisticated than the other so that one of the bending or folding stations is capable of performing more complicated bending operations than the other. Also, one of the bending or folding stations may be placed at a different level (not shown) with respect to the other as dictated by space and size conditions. The only requirements are that the placement of each bending or folding station is such that the slope of the exit gravity chutes is sufficient so that the cut blanks 3 freely slide and stack at the fixed, upright flanges 10 and 21 solely by gravity, and that the bending or folding stations are of an appropriate height from the shop floor 1 for ease of operation by the operators 8 and 23.

One of the raised platform support posts in FIG. 3 forming part of the support structure 15 is shown cut-away at numeral 18 to show an operator 8 standing on the shop floor 1 in front of the first bending or folding station 6. Similarly, one of the support posts 15 is cut-away at the left side of the Figure at 32 to show the second bending or folding station 22.

The cut blanks 3 which exit from the cutting station 2 can sequentially or alternatively slide down either of the exit chutes 9 and/or 20 as indicated by the arrows to stack at the fixed, upright flanges 10 and 21, whereby the operators 8 or 23 can easily remove them for entry into either the first bending or folding station 6 or the second bending or folding station 22. The exit chutes 9 and 20 thus provide an automatic transfer between the cutting station and the bending or folding stations without (1) requiring the step of manually transferring the cut blanks 3 to the bending or folding stations as is required in the simple system of FIG. 1, or (2), the expensive electromechanical transfer mechanisms of the complex prior art systems referred to above.

As disclosed in FIGS. 1 and 2, the cutting station 2 may comprise as complex or as simple a structure as required to perform the jobs demanded. In any case, FIG. 3 does not specify how the redirection of the cut blanks 3 is performed, but is broadly directed to the generic concept of dual oppositely directed exit chutes. Thus, this feature is only generically indicated by the arrow 24 in FIG. 3, while several specific redirection devices are disclosed in FIGS. 4–9. Needless to say, the redirection devices of FIGS. 4–9 are not intended to be exhaustive of all possible types of redirection devices, but are merely representative of such devices.

Similarly, the bending or folding stations 6 and 22 may vary in complexity dependent upon the jobs demanded. Also, the bending or folding stations 6 and 22 themselves may have different capabilities one with respect to the other. Thus, each of the bending or folding stations may operate on the same type of cut blanks 3 to process the same type of end product, or alternatively, different complexity jobs may be performed on the different bending or folding stations 6 and 22. Therefore, the cut blanks 3 may have different characteristics, one from another, so that the blanks 3 that are directed to the first bending or folding station 6 may be of different size and shape so that they will be processed by bending or folding station 6 into different end products than the blanks 3 that are processed by the other bending or folding station 22. In this regard, depending on the complexity of the cutting station 2 and the redirecting mechanism 24, blanks 3 may be alternatively fed to each bending or folding station, or whole groups of blanks may be fed as a group, first to one of the bending stations and then to the other, alternately. These sequences will depend on the type of end products to be processed and the capabilities of the various cutting and bending or folding components of the overall machine. In any case, a wide range of complexities and variations from one overall installation to the next are contemplated. Again, the result is a simple and elegant solution to the problems of the prior art as outlined above. Furthermore, since most cutting operations are inherently faster than the bending or folding operations which may require a number of steps, the overall efficiency of this machine is increased as much as 100% depending on the nature of the product produced and the complexity of the machines employed, as compared with my parent machine of FIG. 2.

Figures 4, 5, 6, 7:
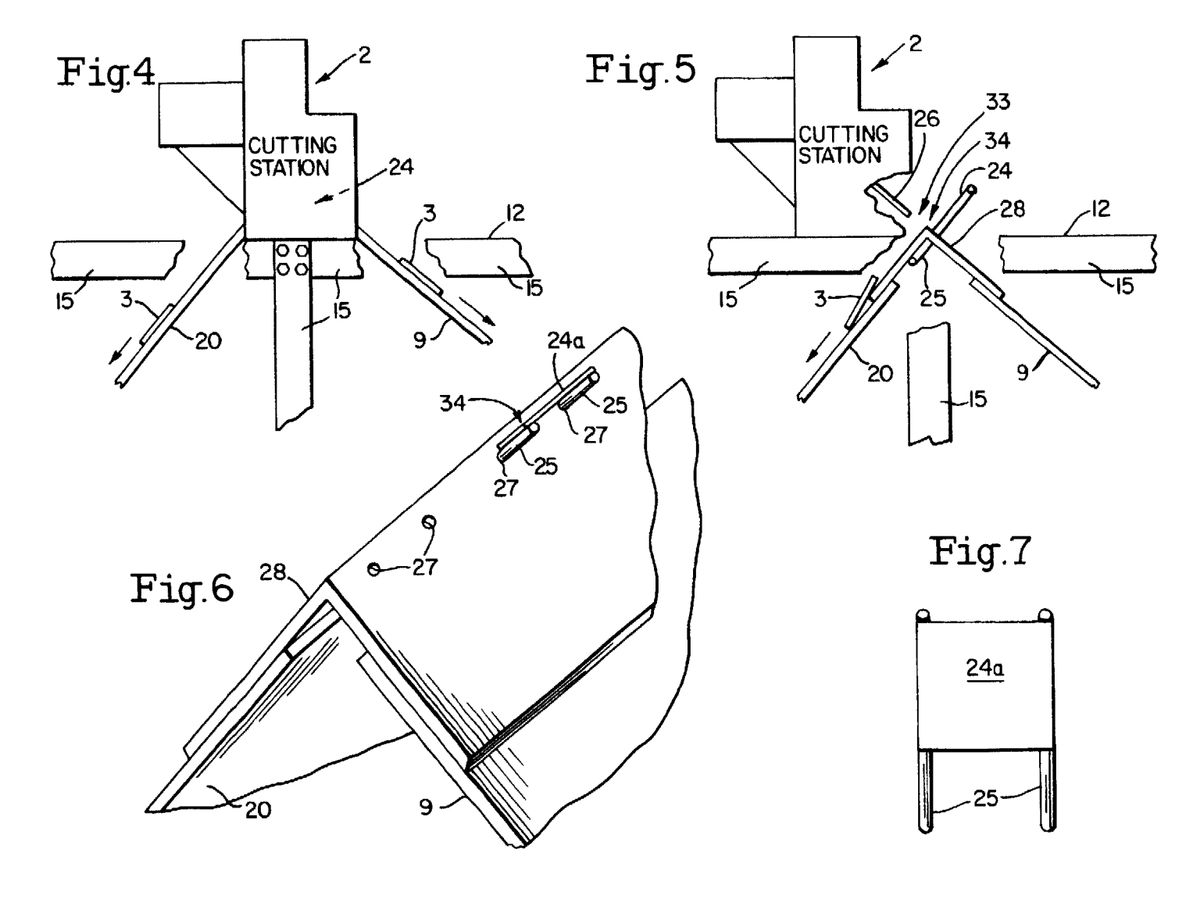
FIG. 4 is a side view of a variation of my invention comprising a cutting station which allows the exiting of cut blanks either from the front of the cutting machine or from the rear of the cutting machine to the oppositely facing, gravity fed inclined chutes of FIG. 3.
FIG. 5 is a side view of a variation of my invention comprising a cutting station which only exits cut blanks from one side of the machine, and further comprises a simple device for directing the cut blanks to either the forward directed gravity chute or to the rear directed gravity chute of FIG. 3.
FIG. 6 is a three dimensional view of the cap which bridges the gap between the two oppositely facing gravity chutes in FIG. 5. One side of the cap is provided with a series of holes near and along its apex to receive several manually placed devices which redirect the cut blanks from the forward directed gravity chute to the rear directed gravity chute of FIG. 3.
FIG. 7 is a plane view of one of the manually placed devices for redirecting the cut blanks from the forward gravity chute to the rear gravity chute as utilized in FIGS. 5 and 6.

FIG. 4 discloses a first variation of my machine which comprises a cutting station 2 mounted on the raised platform 12 of FIG. 3. In this embodiment, cutting station 2 has the ability to exit cut blanks 3 from either the front or the rear of the cutting machine. Such cutting machines are available commercially, but have not been found to be the best choice in actual use because, (1) they are more difficult to program, (2) they are more subject to breakdown, they must be changed over from front to rear operation, and (3), they are not easily or quickly converted from front to rear operation. Thus, even though this version of my cutting and redirecting apparatus superficially appears to be an ideal apparatus to implement my improved method and apparatus, this implementation may not be the best choice.

In any case, with the cutting station of FIG. 4, the redirecting apparatus 24 is built within the commercially available machine. Therefore, no details of the redirecting mechanism are disclosed herein. Thereafter, the front and rear exit troughs 5 (see FIG. 1) of such a machine are each modified and extended to form the exit chutes or ramps 9 and 20 which extend from the front and rear exits of the cutting machine 2 to the upright input flanges 10 and 21 of FIG. 3. The support structure 15 is shown cut-away to show how the exit chutes 9 and 20 are adapted to the cutting station 2. The lower ends of the exit chutes 9 and 20 are also shown cut-away since that detail is fully disclosed in FIG. 3 and need not be repeated. Thus, as with FIG. 3, the exit chutes 9 and 20 allow the cut blanks 3 to slide down to the input of the bending or folding stations 6 and 22 (See FIG. 3) where they stack against the fixed, upright flanges 10 and 21 for easy entry into the bending or folding stations by the operators 8 and 23 as also shown in FIG. 3.

FIG. 5 discloses a simple mechanical variation 24 for directing and redirecting the blanks 3 to the exit chutes 9 and 20 of FIG. 3. In this embodiment, the cutting station 2 comprises a machine that only exits the cut blanks 3 from one side of the machine, such as the front side as shown. Here, the cut blanks 3 are disclosed as exiting from the front exit of the cutting station 2 and redirected by the directing means 24 to the rear exit chute 20 of FIG. 3. In this Figure, the cutting station 2 may comprise the same cutting machine of FIGS. 1 and 2 where the cut blanks 3 are exited from the front of the cutting machine. Of course, a rear exiting cutting station 2 would operate equally well as long it is positioned on the raised platform 12 so that the exit trough 26 is appropriately directed toward the directing mechanism 24.

The directing mechanism 24 is very simple in the embodiment of FIG. 5. Instead of connecting the exit chutes 9 and 20 to the exit chute 26 of the cutting machine 2, the exit chutes 9 and 20 are capped at their top ends by a cap 28. The cap 28 is the upside down V-shaped member which extends the full width of the exit chutes 9 and 20, as shown in the three dimensional view of FIG. 6. Cap 28 is firmly attached to the tops of the exit chutes such as by welding to the top ends of the exit chutes 9 and 20.

The side external portion of the cutting station 2 is shown cut-away so that the exit trough 26 of the cutting machine is exposed. In FIG. 5, a gap 33 is provided between the apex of the cap 28 and the end of the exit trough 26 of the cutting machine. Also in FIG. 5, a redirecting mechanism 24 is attached near the apex of the cap 28 by a plurality of holes 27 drilled through the cap 28 along the right hand side of the apex as shown in FIG. 6. The redirecting mechanism 24 thus comprises a plurality of elements 24a as shown in FIGS. 6 and 7. Since the elements 24a are placed to the right of the apex of the cap 28, a small lip 34 is formed between the elements 24a and the apex of the cap.

As disclosed in FIGS. 6 and 7, each element 24a is simply a flat plate welded along its back side edges to rods 25 as shown in FIG. 7. The rods 25 extend downwardly from the bottom of the flat plate so that the ends of the rods 25 can be inserted into the holes 27 as shown in FIGS. 5 and 6.

When a plurality of elements 24a are manually inserted along the apex of the cap 28 as shown in FIG. 5, the cut blanks 3 stack against the elements 24a on the lip 34 as they exit from the cutting station 2, thus bridging the gap 33 between the end of the exit trough 26 and the cap 28. In this simple embodiment, the operator must then periodically lift the edges the stacked blanks 3, tilting them and allowing them to slide through the gap 33 along the cap 28 and the exit chute 20, and thus, to the rear bending or folding station 22 of FIG. 3. Alternatively, when the elements 24a are removed from the apex of the cap 28, the blanks 3 bridge the gap 33 and slide down the right side of the cap 28 to the front exit chute 9, and thus, to the front bending or folding station 6 of FIG. 3.

Although a single element 24a along the full length of the apex of the cap 28 could be employed to establish the simple redirecting apparatus 24 in FIG. 5, such an element would be awkward to handle and install by the operator. Moreover, periodic hand openings like the cutouts 36 in FIG. 11 would be required so that the operator can reach the edges of the cut blanks 3 whereby they can be lifted and allowed to slid down through the gap 33 along the left hand side of the cap 28 to the exit chute 20. Thus, a plurality of elements 24a are used in FIG. 5 as the easiest implementation of this embodiment.

Figure 8:
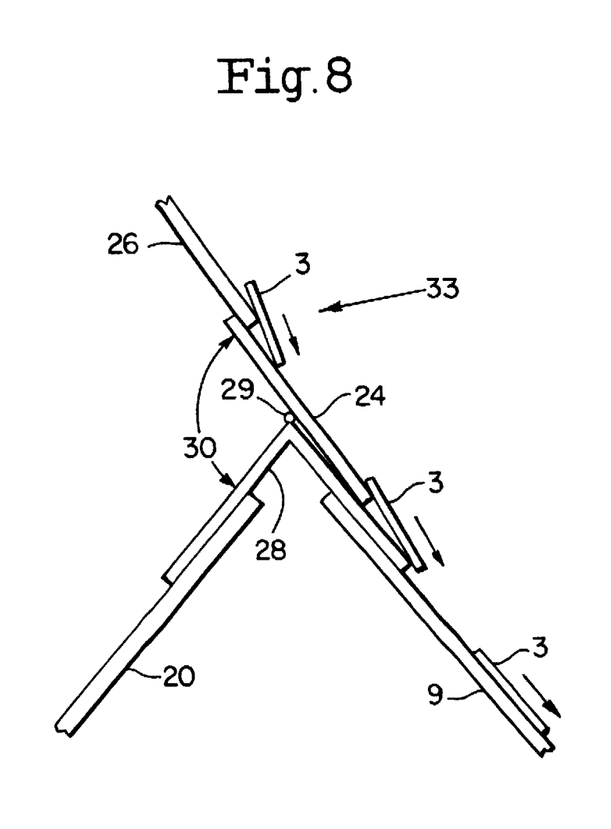
FIG. 8 is a side view of a further variation of my invention wherein the directing device comprises a flat plate which is attached by hinges to the cap bridging the two inclined chutes along its center and which extends into the Figure along the length of the apex of the bridging cap. The flat plate can pivot between two fixed positions. In the position shown in this Figure, the cut blanks are directed from the exit of the cutting station to the forward gravity chute.
Figures 10, 11:
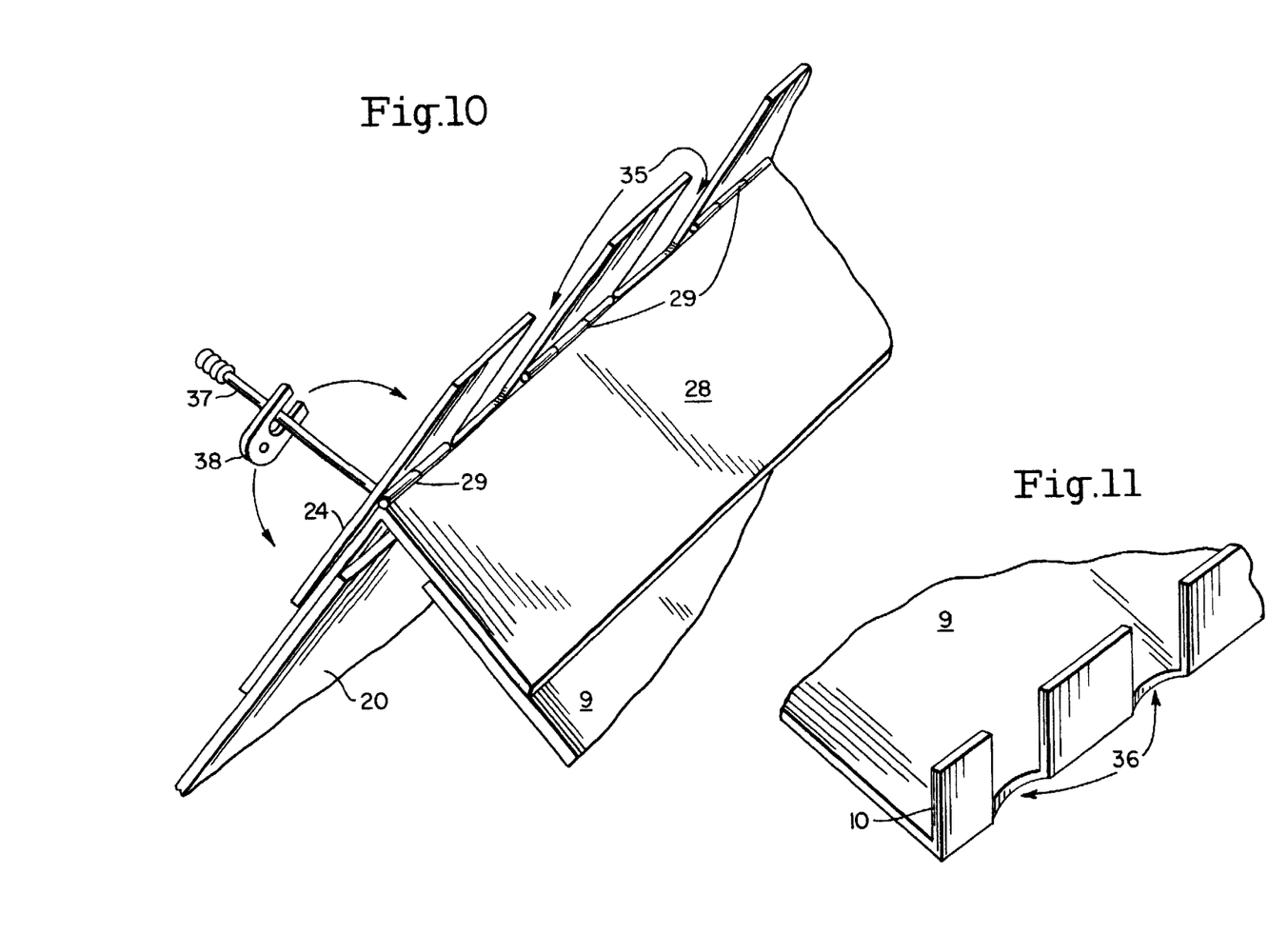
FIG. 10 is a three dimensional view of the directing plate of FIGS. 8 and 9 in which periodic cutouts are shown in the right hand side of the plate so that extra wide cut blanks can be manually cleared if necessary.
FIG. 11 is a three dimensional view of one of the fixed upright flanges at the bottom of each of the gravity fed chutes against which the cut blanks stack after passing from the output of the cutting station to the input of each of the bending or folding stations.

FIG. 8 discloses a further embodiment of the redirecting means 24 which can be used in FIG. 3. This embodiment is adaptable to a single exit cutting station 2 such as that shown in FIG. 5. Thus, exit trough 26 from the cutting station 2 in FIG. 3 sequentially exits the cut blanks 3 as indicated by the direction of the arrows over each blank 3. In this embodiment, the redirecting means 24 comprises a flat plate which is attached at its center to the apex of the cap 28 by means of a hinge 29. Thus, the flat plate 24 can rotate from one position to the other as indicated by the arrow 30. The flat plate 24 extends into the Figure the full length of the cap 28, and thus, the full width of the cutting station exit trough 26 and the full width of the gravity exit chutes 9 and 20. The flat plate 24 may have periodic openings 35 along its right hand side as indicated in FIG. 10. The function of the openings 35 are described below.

The hinge 29 can be a piano hinge mounted along the bottom center of the full length of the plate 24 and pivotally attached to the apex of the cap 28. Alternatively, the hinge 29 may comprise two or more hinges along the width of the plate as desired (See FIG. 11). In the configuration of FIG. 8, the plate 24 is pivoted about the apex of cap 28 to the position shown where one end abuts against the right hand side of the cap 28, and the other end abuts against the bottom of the cutting machine exit trough 26. In this position, the redirecting plate 24 blocks the gap 33 formed between the end of the cutting machine exit trough 26 and the apex of the cap 28 which locks the ends of the exit chutes 9 and 20 together as discussed above in the description of FIG. 5. Thus, blanks 3, as indicated by the arrows, slide from trough 26 along the face of the directing plate 24 over the edge of the cap 28 and onto the exit chute 9. The dimensions of the components and the blanks of this Fig. are exaggerated to more clearly depict the operation of FIG. 8. Thus, in the position of plate 24 shown in this Fig., all of the blanks 3 are directed to the front exit chute 9.

Figure 9:
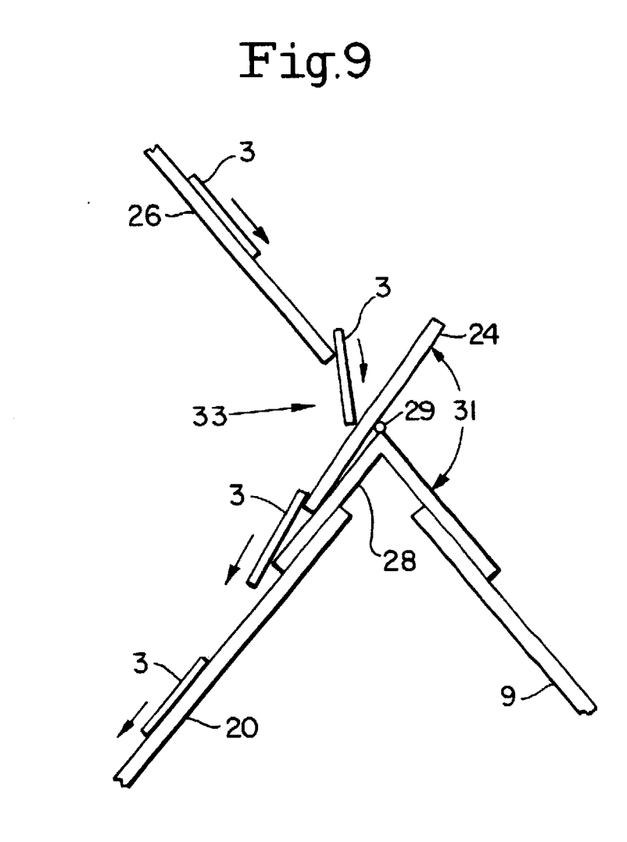
FIG. 9 is a further side view of the variation of my invention of FIG. 8 in which the hinged flat plate directing device is rotated to its opposite fixed position, whereby the cut blanks are redirected from the exit of the cutting station to the rear directed gravity chute.

In FIG. 9 the embodiment of FIG. 8 is again shown, but now the redirection plate 24 has been rotated to its opposite extreme. Thus, one end of the plate now abuts the opposite side of the cap 28 which opens the gap 33, and the other end of the plate 24 extends upwardly. In this position, the blanks 3 slide down the cutting station trough 26 and bump against the direction plate 24. Because the top surface of the plate 24 is smooth, and as long as the blanks 3 are not much wider than twice the width of the gap 33, they will tilt downwardly, then slide down the redirection plate 24 through the gap 33, across the end of the cap 28, and down the rear directed exit chute 20 to the input of the rear bending or folding station 22.

In those rare instances where the blanks 3 are much wider than twice the width of the gap 33, or for whatever other reason, there may be times when the blanks 3 jam against the redirection plate 24. In these instances, the operator can easily release the jam in the same manner as the blanks 3 are released in the simple embodiment of FIG. 5 described above, thus allowing them to slide down the rear chute 20. The release is accomplished with the hand openings 35 which are periodically provided along the width of the redirection plate 24 as shown in FIG. 10. The spaced openings 35 thus perform the same function as the spacing of the redirection elements 24a in the FIG. 5 embodiment described above. The spaced openings 35 have a width sufficient such that the operator's hand can reach through them to grasp the blanks 3 which have jammed against the plate. The openings are spaced along the width with sufficient spacing dependent on the width of the blanks 3 and the convenience of the operator. Also, the spaced openings 35 along the right hand side of the redirection plate 24 do not affect the operation of FIG. 8 in any way because the blanks 3 simply bridge and slide over the openings 35 when the plate 24 is in its FIG. 8 position. In this figure, the hinged connection to the apex of the cap 28 comprises a plurality of hinges 29 mounted between the spaced openings 35. As noted above, however, this is simply a representative showing of any number of ways in which the plate 24 can be hinged to the cap 28.

Not shown in FIGS. 8 or 9, but attached to one end of the flat redirecting plate 24, is a handle 37 shown in FIG. 10 which can be used by the operator to manually position the plate 24 from one position to the other. Also disclosed in FIG. 10 is a convenient locking means 38 which is used to hold the handle, and thus the attached plate 24, at either one of its two end positions as shown in FIGS. 8 and 9. Alternatively, device 38 can be an automatic device for moving (As shown by the arrows) the plate 24 between its two end positions, dependent upon the complexity of the installation, and the need for a rapid operation of the plate 24 for automatically redirecting the blanks 3 from one exit chute to the other.

Finally, FIG. 11 is a three dimensional view of the fixed, upright flange 10 at the end of the forward chute 9. As noted above, the same type of fixed, upright flange 21 is provided at the end of the rear chute 20 of FIG. 3. This Figure shows that the periodic cutouts 36 are provided along the width of the fixed, upright flange 10. Cutouts 36 have a width sufficient such that the operator's hands can reach through the cutouts and grasp the blanks 3 which have stacked against the flange. This provides for easy transfer of the blanks into the bending station 6. The cutouts 36 are spaced as necessary dependent upon the width of the blanks and for ease of operation by the operator.

Without further analysis, the foregoing so fully reveals the gist of the present invention that others can, by applying current knowledge, readily adapt it for various applications without omitting features that, from the standpoint of the prior art fairly constitute essential characteristics of the generic and specific aspects of my contribution to the art, and therefore, such adaptations should and are intended to be comprehended within the meaning and range of equivalence of the appended claims.

I claim:

1. A three station apparatus for the processing of sheet material to form articles of manufacture comprising:

a. A first elevated cutting station which receives said sheet material, performs a first cutting operation thereon, and exits a plurality of precise blanks all of which have the same physical consecutive orientation therefrom, b. A first bending or folding station at a lower level and offset laterally in a first direction from said first elevated cutting station which receives a consecutively oriented first portion of said precise blanks exited from said first elevated cutting station and performs a bending or folding operation thereon to form said articles of manufacture, c. A first inclined chute between said first elevated cutting station and said first bending or folding station which receives said consecutively oriented first portion of said precise blanks exited from said first elevated cutting station and automatically transfers them solely by gravity to said first bending or folding station, d. A second bending or folding station at a lower level and offset laterally in a second direction from said first elevated cutting station which receives a consecutively oriented second portion of said precise blanks exited from said first elevated cutting station and performs a bending or folding operation thereon to also form said articles of manufacture, e. A second inclined chute between said first elevated cutting station and said second bending or folding station which receives said consecutively oriented second portion of said precise blanks exited from said first elevated cutting station and automatically transfers them solely by gravity to said second bending or folding station, f. A directing apparatus at the output of said first elevated cutting station which directs said consecutively oriented first and second portions of said precise blanks to either said first inclined chute or to said second inclined chute, g. Wherein said consecutively oriented first and second portions of said precise blanks are all physically consecutively oriented in the same way with respect to said first elevated cutting station as they exit from said first elevated cutting station and before they enter said directing apparatus.

2. An apparatus as recited by claim 1 wherein each of said first and second inclined chutes transfer said consecutively oriented first and second portions of said precise blanks solely by means of gravity, wherein said first inclined chute is terminated with a first fixed upstanding flange, and wherein said second inclined chute is terminated with a second fixed upstanding flange, whereby said consecutively oriented first and second portions of said precise blanks are stacked against one or the other of said first and second fixed upstanding flanges at the input of said first and second bending or folding stations.

3. An apparatus as recited by claim 1 wherein said sheet material is sheet metal and said articles of manufacture are roof flashings.

4. An apparatus as recited by claim 2 wherein said sheet material is sheet metal and said articles of manufacture are roof flashings.

5. An apparatus as recited in by claim 1 wherein said first elevated station is supported at a first elevated level by a massive superstructure wherein:

a. Said massive superstructure is sufficient to support an operator, and b. A stairway between said first elevated level and said lower level to facilitate the movement of said operator between said first elevated station and said lower level, and vice-versa.

6. A method for arranging and operating a three station system for forming articles of manufacture from sheet material comprising:

a. Providing a first elevated processing station for receiving said sheet material from an operator and cutting a plurality of precise blanks therefrom all of which have the same physical consecutive orientation, b. Providing a first bending or folding station which is placed at a lower level than said first elevated processing station and which is placed offset laterally in a first direction from said first elevated processing station and which accepts a consecutively oriented first portion of said precise blanks and forms said articles of manufacture therefrom, c. Providing a first inclined chute terminated with a first fixed upright flange between said first elevated processing station and said first bending or folding station whereby said consecutively oriented first portion of said precise blanks are automatically transferred solely by gravity from said first elevated processing station to stack against said first fixed upright flange at the input of said first bending or folding station, whereby said operator feeds them into said first bending or folding station, d. Providing a second bending or folding station which is also placed at a lower level than said first elevated processing station and which is placed offset laterally in a second direction with respect to said first elevated processing station, and which is also offset from said first bending or folding station, and which accepts a consecutively oriented second portion of said precise blanks and also forms said articles of manufacture therefrom, e. Providing a second inclined chute terminated with a second fixed upright flange between said first elevated processing station and said second bending or folding station whereby said consecutively oriented second portion of said precise blanks are automatically transferred solely by gravity from said first elevated processing station to stack against said second fixed upright flange at the input of said second bending or folding station, whereby said operator, or another operator, feeds them into said second bending or folding station, f. Providing a directing apparatus at the output of said first elevated processing station which directs said consecutively oriented first and second portions of said precise blanks to either said first inclined chute or to said second inclined chute, g. Wherein said consecutively oriented first and second portions of said precise blanks are all physically oriented in the same way with respect to said first processing station as they exit from said elevated processing station, and before they enter said directing apparatus, and h. Wherein said operator, or operators, supplies said first bending or folding station or said second bending or folding station, or both said stations.

7. The method of claim 6 wherein said sheet material is sheet metal and said articles of manufacture are roof flashings.

8. A method as recited in claim 6, further providing:

a. A massive superstructure of sufficient strength to support said first elevated processing station, and b. A stairway between said first elevated processing station and said lower level whereby said operator, or operators, can move between said first elevated processing station and said lower level, and vice-versa.

9. A three station apparatus for the multiple processing of relatively wide, thin, flexible sheet material of such wide, thin and flexible nature that it will visible and elastically bend of its own weight when supported only by its ends to form articles of manufacture comprising:

a. A first elevated station which receives said relatively wide, thin, flexible sheet material, performs a cutting operation thereon, and exits by the weight of said relatively wide, thin, flexible sheet material, a plurality of relatively wide, thin, flexible and precisely cut blanks therefrom all of which have the same physical consecutive orientation, said relatively wide, thin, flexible and precisely cut blanks also being of such wide, thin, and flexible nature that they will visibly and elastically bend of their own weight when supported only by their widest ends;

b. A first bending or folding station at a lower level and offset laterally in a first direction from said first elevated station which receives a consecutively oriented first portion of said relatively wide, thin, flexible and precisely cut blanks exited from said first elevated station and performs a bending or folding operation thereon to form said articles of manufacture;

c. A second bending or folding station at a lower level and offset laterally in a second direction from said first elevated station and from said first bending or folding station which receives a consecutively oriented second portion of said relatively wide, thin, flexible and precisely cut blanks exited from said first elevated station, and performs a bending or folding operation thereon to also form said articles of manufacture, said articles of manufacture may be the same as or different from said articles of manufacture formed in said first bending or folding station;

d. A first inclined chute between said first elevated station and said first bending or folding station which receives said consecutively oriented first portion of said relatively wide, thin, flexible and precisely cut blanks exited from said first elevated station, and automatically transfers them by sliding them solely by gravity to the input of said first bending or folding station;

e. A second inclined chute between said first elevated station and said second bending or folding station which receives said consecutively oriented second portion of said relatively wide, thin, flexible and precisely cut blanks exited from said first elevated station, and automatically transfers them by sliding them solely by gravity to the input of said second bending or folding station;

f. A first fixed, upstanding flange at the input of said first bending or folding station wherein said consecutively oriented first portion of said relatively wide, thin, flexible and precisely cut blanks slide down said first inclined chute and stack against said first fixed, upstanding flange at said input of said first bending or folding station wherein said bending or folding operation is subsequently performed thereon to form said articles of manufacture;

g. A second fixed, upstanding flange at the input of said second bending or folding station wherein said consecutively oriented second portion of said relatively wide, thin, flexible and precisely cut blanks slide down said second inclined chute and stack against said second fixed, upstanding flange at said input of said second bending or folding station wherein said bending or folding operation is subsequently performed thereon to also form said articles of manufacture.

10. The apparatus as recited in claim further comprising a. A directing apparatus at the output of said first elevated station which directs said consecutively oriented first portion of said relatively wide, thin, flexible and precisely cut blanks to said first inclined chute, and which directs said consecutively oriented second portion of said relatively wide, thin, flexible and precisely cut blanks to said second inclined chute, and b. Wherein said consecutively oriented first and second portions of said precise blanks are all physically consecutively oriented in the same way as they exit from said first elevated, and before they enter said directing apparatus.

11. The apparatus as recited in claim 10 wherein said directing apparatus is either manual or automatic in operation.

12. The apparatus as recited in claim 10 wherein said directing apparatus is manual in operation.

13. The apparatus as recited in claim 10 wherein said directing apparatus is automatic in operation.

14. The apparatus as recited in claim 9 wherein said relatively wide, thin, flexible sheet material is sheet metal and said articles of manufacture are roof flashings.

15. The apparatus as recited in claim 9 wherein said articles of manufacture formed from said consecutively oriented first portion of said relatively wide, thin, flexible and precisely cut blanks are different from said consecutively oriented second portion of said relatively wide, thin, flexible and precisely cut blanks.

* * * * *